(12) United States Patent
Liang et al.

(10) Patent No.: US 12,347,072 B2
(45) Date of Patent: Jul. 1, 2025

(54) METHODS FOR ENHANCEMENT OF LOW-LIGHT IMAGES BASED ON REINFORCEMENT LEARNING AND AESTHETIC EVALUATION

(71) Applicant: NANJING UNIVERSITY OF AERONAUTICS AND ASTRONAUTICS, Jiangsu (CN)

(72) Inventors: Dong Liang, Nanjing (CN); Ling Li, Nanjing (CN); Shengjun Huang, Nanjing (CN); Songcan Chen, Nanjing (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 0 days.

(21) Appl. No.: 18/976,298

(22) Filed: Dec. 10, 2024

(65) Prior Publication Data
US 2025/0139745 A1    May 1, 2025

Related U.S. Application Data

(63) Continuation-in-part of application No. PCT/CN2023/074843, filed on Feb. 7, 2023.

(30) Foreign Application Priority Data

Jun. 10, 2022    (CN) .......................... 202210650946.7

(51) Int. Cl.
*G06T 5/60*    (2024.01)
*G06T 5/92*    (2024.01)
*G06T 5/94*    (2024.01)

(52) U.S. Cl.
CPC .................. *G06T 5/60* (2024.01); *G06T 5/92* (2024.01); *G06T 5/94* (2024.01);
(Continued)

(58) Field of Classification Search
CPC .... G06T 5/60; G06T 5/94; G06T 5/92; G06T 2207/10024; G06T 2207/20081; G06T 2207/20084
(Continued)

(56) References Cited

U.S. PATENT DOCUMENTS

2019/0295223 A1    9/2019    Shen et al.

FOREIGN PATENT DOCUMENTS

| CN | 112258420 A | 1/2021 |
| CN | 113033693 A | 6/2021 |

(Continued)

OTHER PUBLICATIONS

Zhang, Rongkai, et al. "Rellie: Deep reinforcement learning for customized low-light image enhancement." Proceedings of the 29th ACM international conference on multimedia. 2021. (Year: 2021).*
Hu, Yuanming, et al. "Exposure: A white-box photo post-processing framework." ACM Transactions on Graphics (TOG) 37.2 (2018): 1-17. (Year: 2018).*

(Continued)

*Primary Examiner* — Jonathan S Lee
(74) *Attorney, Agent, or Firm* — Porus IP LLC

(57) ABSTRACT

Disclosed is a method for enhancement of a low-light image based on reinforcement learning and aesthetic evaluation. The method include: generating images of non-normal luminance under different lighting scenes, and constructing a training dataset for a reinforcement learning system based on the images; initializing the training dataset, a policy network, and a value network; updating, based on a no-reference reward score and an aesthetic assessment reward score, the policy network and the value network; completing model training and outputting an enhanced image result. By expanding the action space range defined in reinforcement learning, the enhancement operations for the input low-light image gain a greater dynamic range, offering higher flexibility for real-world scenarios and better meeting low-light image enhancement needs. Additionally, by incorporating (Continued)

the aesthetic quality assessment scores as part of the loss function, the enhanced image achieves better visual effects and higher subjective user evaluation scores.

4 Claims, 4 Drawing Sheets

(52) U.S. Cl.
CPC .............. *G06T 2207/10024* (2013.01); *G06T 2207/20081* (2013.01); *G06T 2207/20084* (2013.01)

(58) Field of Classification Search
USPC .......................................................... 382/157
See application file for complete search history.

(56) References Cited

FOREIGN PATENT DOCUMENTS

| | | |
|---|---|---|
| CN | 114037622 A | 2/2022 |
| CN | 114219182 A | 3/2022 |
| CN | 114283083 A | 4/2022 |
| CN | 114723643 A | 7/2022 |

OTHER PUBLICATIONS

International Search Report in PCT/CN2023/074843 mailed on Apr. 28, 2023, 6 pages.

Written Opinion in PCT/CN2023/074843 mailed on Apr. 28, 2023, 6 pages.

First Office Action in Chinese Application No. 202210650946.7 mailed on Jul. 15, 2022, 13 pages.

Kin, Gwn-Lore et al., LLNet: A Deep Autoencoder Approach to Natural Low-light Image Enhancement, Pattern Recognition, 650-662, 2017.

Chen, Wei et al., Deep Retinex Decomposition for Low-Light Enhancement, arXiv:1808.04560, 1-12, 2018.

Yang, Wenhan et al., From Fidelity to Perceptual Quality: A Semi-Supervised Approach for Low-Light Image Enhancement, 2020 IEEE/CVF Conference on Computer Vision and Pattern Recognition (CVPR), 3060-3069, 2020.

Zhnag, Yonghua et al., Kindling the Darkness: A Practical Low-light Image Enhancer, 2019 Association for Computing Machinery, 1632-1640, 2019.

Guo, Chunle et al., Zero-Reference Deep Curve Estimation for Low-Light Image Enhancement, 2020 IEEE/CVF Conference on Computer Vision and Pattern Recognition (CVPR), 1777-1786, 2020.

* cited by examiner

100

S1: Generating images of non-normal luminance under different lighting scenes, and constructing a training dataset for a reinforcement learning system based on the images of non-normal luminance S2: Initializing the training dataset, a policy network, and a value network in the reinforcement learning system S3: Updating, based on a no-reference reward score and an aesthetic assessment reward score, the policy network and the value network S3.1: Training the training dataset based on historical phase images to obtain an environmental reward value S3.2: Training the training dataset based on the historical phase images to obtain the value network output value S3.3: Updating the value network based on the environmental reward value and the value network output value S3.4: Updating the policy network based on the environmental reward value and a predicted value S4: Completing model training when all samples are trained and all training iterations are completed S5: Outputting an image result after the enhancement of the low-light image

FIG. 1

METHODS FOR ENHANCEMENT OF LOW-LIGHT IMAGES BASED ON REINFORCEMENT LEARNING AND AESTHETIC EVALUATION

CROSS-REFERENCE TO RELATED APPLICATIONS

This application is a Continuation-in-part of International Patent Application No. PCT/CN2023/074843, filed on Feb. 7, 2023, which claims priority to Chinese Patent Application No. 202210650946.7, filed on Jun. 10, 2022, the entire contents of each of which are incorporated herein by reference.

TECHNICAL FIELD

The present disclosure relates to the field of image enhancement technology, and in particular, to a method for enhancement of a low-light image based on reinforcement learning and aesthetic evaluation.

BACKGROUND

Images captured by a digital camera under a poor lighting condition often suffer from insufficient incoming light reaching a sensor of the digital camera, resulting in a low dynamic range and significant noise interference, thus making it difficult to obtain high-quality images. Low-light image enhancement plays a crucial role in the field of computer vision. Images taken in a low-light condition often exhibit various negative effects, such as blurriness leading to uncertain subjects, facial blur causing inaccurate recognition, and loss of detail resulting in incorrect image interpretation. These issues not only diminish a user's experience with camera devices and reduce photo quality but may also convey incorrect information. Low-light image enhancement improves the luminance, contrast, and structural information of the captured images, which facilitates subsequent high-level tasks such as object detection, face recognition, and image classification, thereby offering significant practical value.

In recent years, deep learning-based techniques typically use high-quality normal-light images as a reference to learn how to improve and enhance low-light images. LL-Net (Kin Gwn Lore, Adedotun Akintayo, and Soumik Sarkar. 2017. LLNet: A deep autoencoder approach to natural low-light image enhancement. Pattern Recognition 61 (2017), 650-662) introduced a stacked autoencoder that simultaneously performs denoising and enhancement using synthesized low-light/normal-light image pairs. However, due to differences from real images, the distribution of synthetic data inevitably deviates from real-world images, leading to significant performance degradation when applied to real scenarios. Subsequently, Wei et al. (Chen Wei, Wenjing Wang, Wenhan Yang, and Jiaying Liu. 2018. Deep retinex decomposition for low-light enhancement. arXiv preprint arXiv: 1808.04560 (2018)) collected a real dataset consisting of low-light/normal-light image pairs and proposed a Retinex-based approach to decompose images into illumination and reflectance in a data-driven manner. Following this, numerous other supervised low-light image enhancement neural networks have been proposed (Wenhan Yang, Shiqi Wang, Yuming Fang, Yue Wang, and Jiaying Liu. 2020. From Fidelity to Perceptual Quality: A Semi-Supervised Approach for Low-Light Image Enhancement. In IEEE/CVF Conference on Computer Vision and Pattern Recognition (CVPR); Yonghua Zhang, Jiawan Zhang, and Xiaojie Guo. 2019. Kindling the darkness: A practical low-light image enhancer. In Proceedings of the 27th ACM International Conference on Multimedia. 1632-1640). Recent approaches have focused on unsupervised low-light image enhancement, which allows models to be trained directly using low-light images without any paired training data. Zero-DCE (Chunle Guo, Chongyi Li, Jichang Guo, Chen Change Loy, Junhui Hou, Sam Kwong, and Runmin Cong. 2020. Zero-Reference Deep Curve Estimation for Low-Light Image Enhancement. In Proceedings of the IEEE/CVF Conference on Computer Vision and Pattern Recognition. 1780-1789) employs non-reference loss to train a deep low-light image enhancement model. However, existing deep learning techniques often only address the enhancement of underexposed low-light images, while overlooking the presence of normally exposed or overexposed regions in backlit and uneven lighting scenarios.

On the other hand, for the task of image enhancement, the most important evaluation criterion is the user's subjective judgment. However, existing techniques typically employ reference-based or non-reference-based objective evaluation metrics (e.g., loss functions) to guide model training during the training phase. The reference-based loss functions primarily include an L1 loss, an L2 loss, and a Structural Similarity Index (SSIM) loss, while non-reference loss functions mainly utilize a Spatial Consistency Loss, an Exposure Control Loss, a Color Constancy Loss, and an Illumination Smoothness Loss. These reference and non-reference loss functions focus more on a gap between low-light and normal-light images and image features, often neglecting subjective user assessment.

SUMMARY

One or more embodiments of the present disclosure provide a method for enhancement of a low-light image based on reinforcement learning and aesthetic evaluation. The method comprises: S1, generating images of non-normal luminance under different lighting scenes, and constructing a training dataset for a reinforcement learning system based on the images of non-normal luminance; S2, initializing the training dataset, a policy network, and a value network in the reinforcement learning system; S3, updating, based on a no-reference reward score and an aesthetic assessment reward score, the policy network and the value network; S4, completing model training when all samples are trained and all training iterations are completed; and S5, outputting an image result after the enhancement of the low-light image.

The initializing a policy network and a value network in the operation S2 includes: inputting a current state $s^{(t)}$ into the policy network and the value network, wherein $s^{(t)}$ denotes a state at a time t; an output of the policy network is a policy $\pi(a^{(t)}|s^{(t)})$ for taking an action $a^{(t)}$; and an output of the value network is a value network output value $V(s^{(t)})$, representing an expected total reward from the current state $s^{(t)}$.

The updating the policy network and the value network in the operation S3 includes:

S3.1, training the training dataset based on historical phase images to obtain an environmental reward value, denoted as $R^{(t)}$, using the following equation:

$$R^{(t)} = r^{(t)} + \gamma r^{(t+1)} + \gamma^2 r^{(t+2)} + \ldots + \gamma^{n-1} r^{(t+n-1)} + \gamma^n V(s^{(t+n)})$$

Wherein, $\gamma^i$ denotes an $i^{th}$ power of a discount factor $\gamma$ and $r^{(t)}$ represents an immediate environmental reward value at the time t S3.2, training the training dataset based on the historical phase images to obtain the value network output value.

S3.3, updating the value network using the following equation based on the environmental reward value and the value network output value:

$$d\theta_v = \nabla_{\theta_v}(R^{(t)} - V(s^{(t)}))^2$$

Where $\theta_v$ represents a parameter of the value network.

S3.4, updating the policy network based on the environmental reward value and a predicted value using the following equations:

$$A(a^{(t)}, s^{(t)}) = R^{(t)} - V(s^{(t)})$$

$$d\theta_p = -\nabla_{\theta_p} \log \pi(a^{(t)}|s^{(t)}) A(a^{(t)}|s^{(t)})$$

Wherein $\theta_p$ represents a parameter of the policy network, the output of the policy network is the policy $\pi(a^{(t)}|s^{(t)})$ for taking the action $a^{(t)} \in A$, $\pi(a^{(t)}|s^{(t)})$ is a probability calculated by a softmax function, A represents an action space, and an output dimension of the policy network is |A|.

BRIEF DESCRIPTION OF THE DRAWINGS

The present disclosure will be further illustrated by way of exemplary embodiments, which are described in detail with the accompanying drawings. These embodiments are non-limiting. In these embodiments, the same count indicates the same structure, wherein:

FIG. 1 is a flowchart of an exemplary process for enhancement of a low-light image based on reinforcement learning and aesthetic evaluation according to some embodiments of the present disclosure;

DETAILED DESCRIPTION

Figure 2:
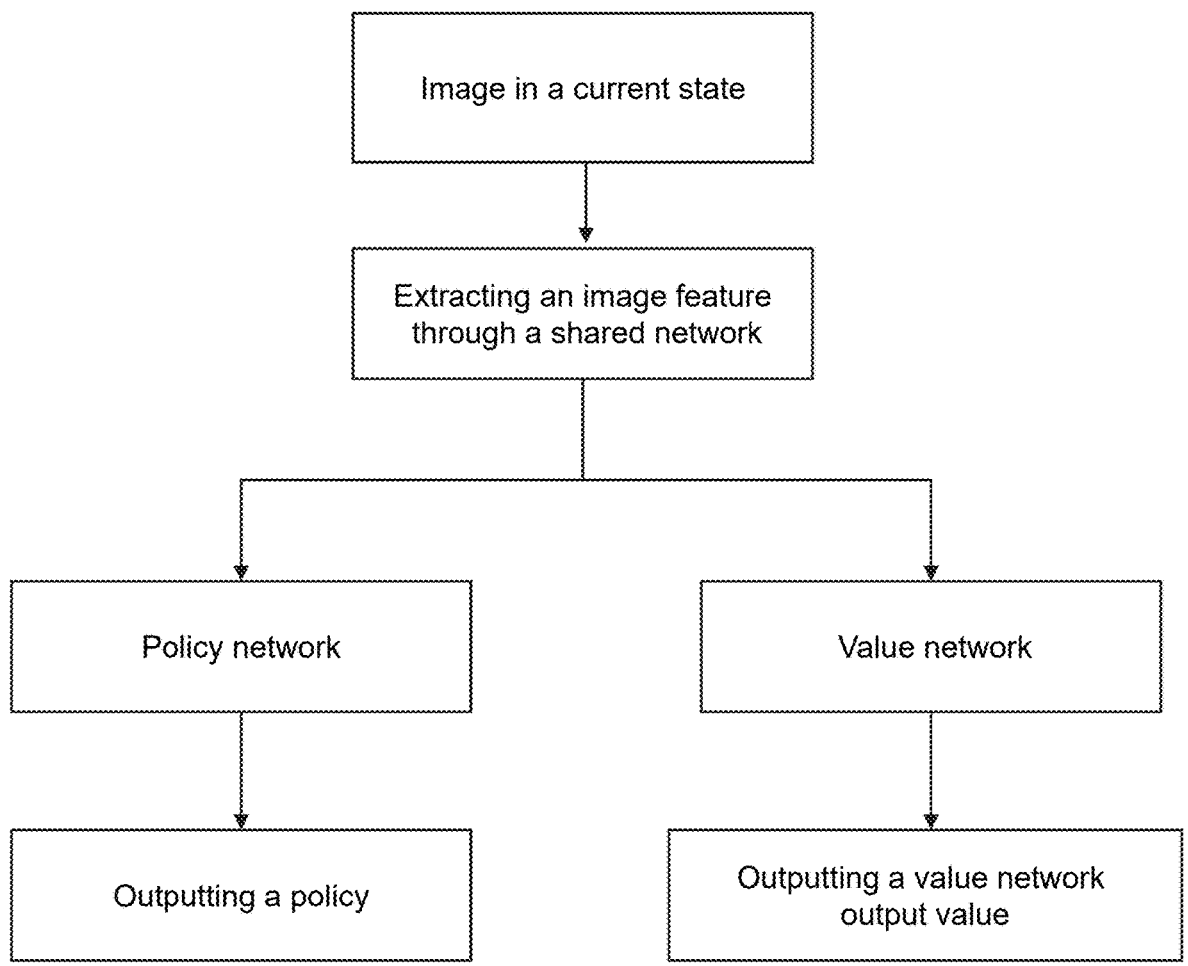
FIG. 2 is a block diagram of an exemplary algorithmic framework of a method for enhancement of a low-light image based on reinforcement learning and aesthetic evaluation according to some embodiments of the present disclosure.

In order to provide a clearer understanding of the technical solutions of the embodiments described in the present disclosure, a brief introduction to the drawings required in the description of the embodiments is given below. It is evident that the drawings described below are merely some examples or embodiments of the present disclosure, and for those skilled in the art, the present disclosure may be applied to other similar situations without exercising creative labor. Unless otherwise indicated or stated in the context, the same reference numerals in the drawings represent the same structures or operations.

It should be understood that the terms "system," "device," "unit," and/or "module" used herein are ways for distinguishing different levels of components, elements, parts, or assemblies. However, if other terms can achieve the same purpose, they may be used as alternatives.

As indicated in the present disclosure and in the claims, the singular forms "a," "an," and "the" may be intended to include the plural forms as well, unless the context clearly indicates otherwise. In general, the terms "comprise," "comprises," and/or "comprising," "include," "includes," and/or "including," when used in this disclosure, specify the presence of stated features, integers, steps, operations, elements, and/or components, but do not preclude the presence or addition of one or more other features, integers, steps, operations, elements, components, and/or groups thereof.

FIG. 1 is a flowchart of an exemplary process for enhancement of a low-light image based on reinforcement learning and aesthetic evaluation according to some embodiments of the present disclosure. In some embodiments, process 100 may be performed by a processor.

The processor may be configured to process data and information when performing a method for enhancement of a low-light image based on reinforcement learning and aesthetic evaluation (hereinafter referred to as the low-light image enhancement method). The processor may execute program instructions based on data, information, or processing results to perform one or more of the functions described in the present disclosure. In some embodiments, the processor may include one or more sub-processing devices (e.g., a single-core processing device, a multi-core processing device, etc.). Merely by way of example, the processor may include a central processing unit (CPU), an application-specific integrated circuit (ASIC), or the like, or any combination thereof.

As shown in FIG. 1, process 100 includes the following operations.

In S1, generating images of non-normal luminance under different lighting scenes, and constructing a training dataset for a reinforcement learning system based on the images of non-normal luminance;

The different lighting scenes may include an insufficient brightness scene, a backlit scene, an uneven lighting scene, or the like. For example, the different lighting scenes may be formed conditions such as daytime and nighttime, sunny and cloudy, as well as indoor and outdoor environments.

The images of non-normal luminance may include a low-light image. The low-light image refers to an image with insufficient brightness, such as a nighttime surveillance image, etc. In some embodiments, the low-light image may also include an image with normal luminance or an overexposed image in situations of backlighting or uneven lighting.

In some embodiments, the processor may obtain a large number of images from a database and process the images in a variety of ways to generate the images of non-normal luminance under the different lighting scenes. Image processing manners may include adjusting a luminance parameter of the images using an image processing library (e.g., OpenCV and PIL), adjusting a local luminance level using a filter, introducing a light noise using the filter, or the like.

The reinforcement learning system refers to a machine learning framework that typically includes components such as a policy network, a value network, a reward value, a state, and an action space.

The policy network refers to a neural network architecture. A policy refers to a rule or mapping used for decision-making. The policy network may be configured to predict a probability of taking each action in a given state, forming a probability distribution that is used to determine an action to be taken in an input state.

The value network is a neural network architecture. The value network may be configured to estimate a value of the given state or a state-action pair. In other words, the policy network is configured to select an action corresponding to a state, and the value network is configured to estimate the value of a reward value for the given state or the state-action pair.

In image processing, an action may include a luminance adjustment, a contrast adjustment, or the like, and the reward value may be characterized by an extent to which the image of non-normal luminance approaches normal luminance after taking the action.

The training dataset may include a plurality of sample images of non-normal luminance. In some embodiments, the processor may transform the sample images of non-normal luminance into state representations, define actions that may be performed and the reward value for taking the actions, and bind the state-action-reward value corresponding to each sample image of non-normal luminance to construct the training dataset for the reinforcement learning system.

In S2, initializing the training dataset, the policy network, and the value network in the reinforcement learning system.

In some embodiments, initialization of the training dataset may include preprocessing of sample data. Preprocessing may include normalization and data enhancement (e.g., rotation, panning, cropping), or the like.

In some embodiments, initialization of the policy network and the value network in operation S2 includes: a current state $s^{(t)}$ into the policy network and the value network, wherein $s^{(t)}$ denotes a state at a time t. An output of the policy network is a policy $\pi(a^{(t)}|s^{(t)})$ for taking an action $a^{(t)}$, and an output of the value network is a value network output value $V(s^{(t)})$, representing an expected total reward from the current state $s^{(t)}$.

The initialization of the policy network refers to initializing a parameter of the policy network. For example, the initialization of the policy network may include calculating a probability, denoted as $\pi$, using a softmax function. $\pi(a^{(t)}|s^{(t)})$ refers to a probability of taking the action $a^{(t)}$ in the current state $s^{(t)}$, as computed through the softmax function.

In some embodiments, when initializing the policy network, an input of the policy network is the current state $s^{(t)}$, and the output of the policy network is the policy $\pi(a^{(t)}|s^{(t)})$ for taking an action $a^{(t)}$ in the current state $s^{(t)}$. t represents a time step t, or a time t, or being in a $t^{th}$ iteration. $a^{(t)}$ represents an action taken at the time step t.

The initialization of the value network refers to initializing a parameter of the value network. For example, by initializing the parameter of the value network, the value network may fit a state value function V(s).

In some embodiments, when initializing the value network, an input of the value network is the current state s(t), and the output of the value network is the expected total reward $V(s^{(t)})$ starting from the current state $s^{(t)}$. The expected total reward $V(s^{(t)})$ represents a total reward expected to be accumulated from the current state $s^{(t)}$, which may characterize the quality of a current network state.

In an initialization phase of the policy network, the output policy is initial and un-optimized. As the training process progresses, the parameter of the policy network is continuously updated based on the reward values output by the value network to learn a better policy that maximize a future accumulated expected total reward. The finally obtained policy represents an optimal distribution of actions to be taken in various possible states.

In S3, updating, based on a no-reference reward score and an aesthetic assessment reward score, the policy network and the value network.

The no-reference reward score refers to a reward value that involves evaluating a quality of an image in the absence of an original reference image. The no-reference reward score may be used as an indicator for objectively assessing the quality of the image. In some embodiments, the no-reference reward score may be related to a spatial consistency loss, an exposure control loss, a color constancy loss, and a luminance smoothness loss. More descriptions of the losses may be found in FIG. 4 and the related descriptions.

The aesthetic assessment reward score refers to a reward value that automatically determines a visual appeal and an artistic value of an image. The aesthetic assessment reward score may be used as an indicator for subjectively assessing the quality of the image. In some embodiments, the aesthetic assessment reward score may be correlated to an aesthetic quality loss. More descriptions of the aesthetic quality loss may be found in FIG. 4 related descriptions.

In some embodiments, the updating the policy network and the value network in S3 includes:

In S3.1, training the training dataset based on historical phase images to obtain an environmental reward value, denoted as $R^{(t)}$, using the following equation:

$$R^{(t)} = r^{(t)} + \gamma r^{(t+1)} + \gamma^2 r^{(t+2)} + \ldots + \gamma^{n-1} r^{(t+n-1)} + \gamma^n V(s^{(t+n)}) \quad (1)$$

Wherein, $\gamma^i$ denotes an $i^{th}$ power of a discount factor $\gamma$ and $r^{(t)}$ represents an immediate environmental reward value at the time t.

The immediate environmental reward value $r^{(t)}$ represents an immediate reward value at the time t, characterizing a short-term gain from taking an action in a state at the time t. The environmental reward value $R^{(t)}$ represents an accumulated reward value starting from the time of t. In some embodiments, the environmental reward value may be determined based on the spatial consistency loss, the exposure control loss, the color constancy loss, the luminance smoothness loss, and the aesthetic quality loss.

The discount factor $\gamma$ is used to discount the reward values at future time steps, so that long-term rewards have less influence on decision making. The discount factor $\gamma$ may be a constant in a range of 0 to 1, and the larger the exponent i is, the smaller the value of $\gamma^i$ is.

$V(s^{(t+n)})$ represents an expected total reward that may be accumulated in the future starting from a state $s^{(t+n)}$ at a time t+n.

The historical phase images refer to images at different historical time points that may be used to train the policy network and the value network. In some embodiments, for a sample image in the training dataset, the state at time t is $s^{(t)}$. After taking an action an $a^{(t)}$ in the state $s^{(t)}$, a historical phase image is obtained, and the corresponding immediate reward value $r^{(t)}$ is calculated. A next state at time t+1 is $s^{(t+1)}$. In the state $s^{(t+1)}$, after performing an action $a^{(t+1)}$, a next historical phase image is obtained, and the corresponding immediate reward value $r^{(t+1)}$ is calculated. This process continues through multiple phases, obtaining corresponding multiple historical phase images and reward values.

Figure 3:
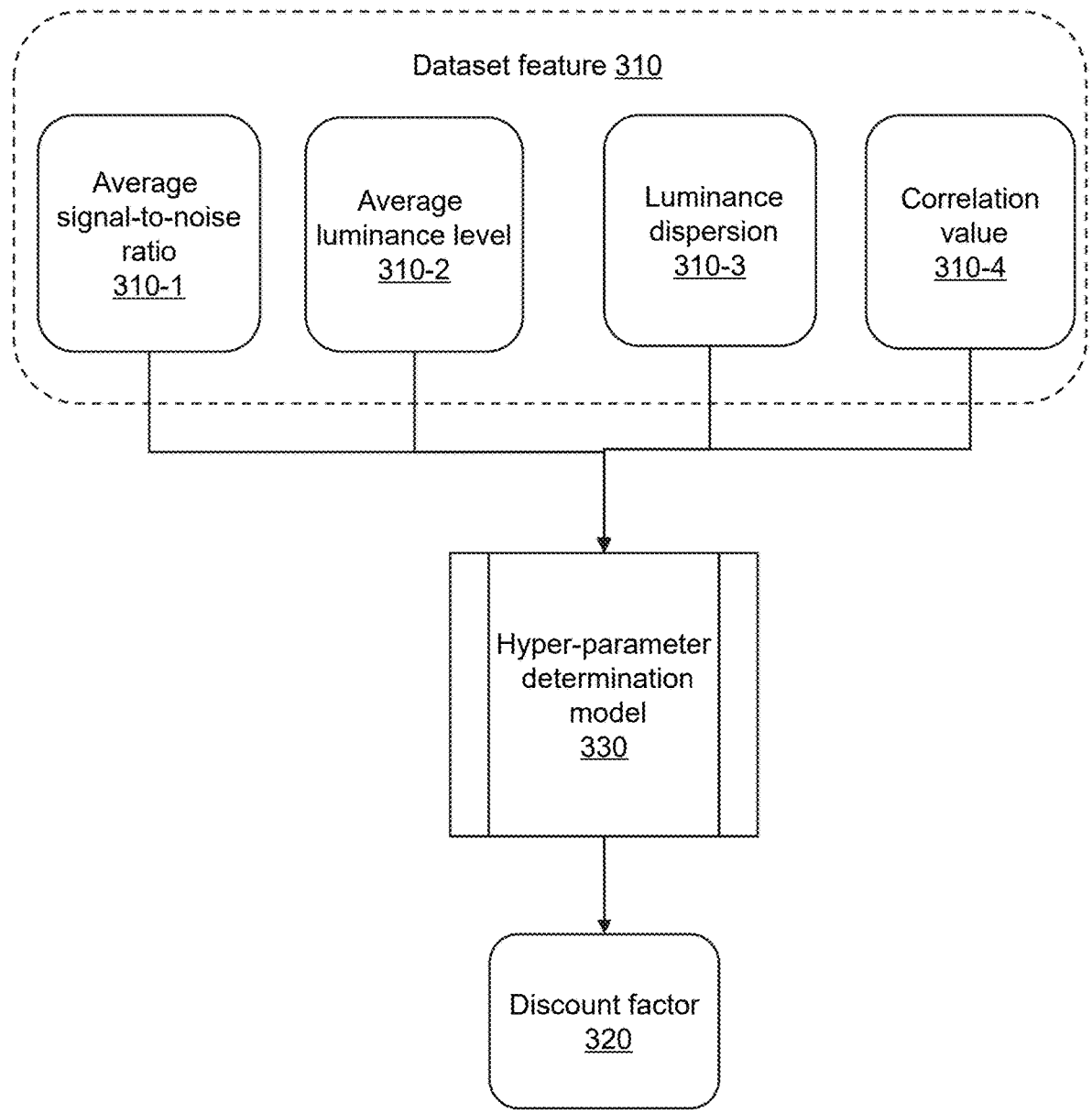
FIG. 3 is an exemplary schematic diagram for determining a discount factor according to some embodiments of the present disclosure.

FIG. 3 is an exemplary schematic diagram for determining a discount factor according to some embodiments of the present disclosure.

In some embodiments, as illustrated in FIG. 3, a discount factor 320 may be determined based on a dataset feature 310 of a training dataset. The dataset feature 310 may include an average signal-to-noise ratio 310-1, an average luminance level 310-2, and a luminance dispersion 310-3.

The average signal-to-noise ratio refers to an average of signal-to-noise ratios of sample images in the training dataset. The signal-to-noise ratios of the sample images may be obtained by a variety of techniques such as a signal-to-noise frequency domain analysis technique, a mean and standard deviation technique, or the like.

The average luminance level refers to an average value of the luminance levels of the sample images in the training dataset. The luminance levels of the sample images may be obtained using a variety of manners. For example, the luminance level of a grayscale image may be represented by an average pixel value, and the luminance level of a color image may be obtained through weighted summation based on RGB channels.

The luminance dispersion refers to a degree of dispersion of the luminance levels of the sample images in the training dataset. The degree of dispersion of luminance levels may be expressed by a variance or standard deviation of the luminance levels.

In some embodiments, a processor may determine the corresponding discount factor based on the average signal-to-noise ratio, the average luminance level, and the luminance dispersion of the training dataset through a vector database.

In some embodiments, the vector database may be constructed based on historical data. The vector database may include a plurality of reference vectors and labels corresponding to the reference vectors.

The processor may obtain a plurality of history training datasets and a plurality of history discount factors used in the plurality of history training sessions, as well as a plurality of history training efficiencies corresponding to the plurality of history training sessions, respectively. The historical training efficiency of a corresponding historical training session may be inversely related to a count of iterations required for the historical training session to converge.

The processor may construct a clustering feature vector based on a historical average signal-to-noise ratio, a historical average luminance level, and a historical luminance dispersion of each of the plurality of historical training dataset, and cluster a plurality of clustering feature vectors corresponding to the plurality of historical training datasets to form a plurality of clusters. For each cluster f, the processor may determine an average value of all clustering feature vectors in the cluster f, which is denoted as $W_f(\bar{b}, \bar{z}, \bar{d})$, wherein $\bar{b}$, $\bar{z}$, and $\bar{d}$ denote an average of the historical average signal-to-noise ratios, an average of the historical average luminance levels, and an average of the historical luminance dispersions, respectively, of all clustered feature vectors in the cluster f. $W_f$ is identified as a reference vector, i.e., one cluster corresponds to one reference vector. For each cluster f, the processor may select a plurality of historical training datasets in the cluster whose corresponding historical training efficiencies are greater than a preset efficiency threshold and denote noted the plurality of historical training datasets as a plurality of representative datasets. The processor may identify an average of a plurality of historical discount factors γ corresponding to the plurality of representative datasets as a label corresponding to the reference vector $W_f$.

The processor may construct the vector database based on a plurality of reference vectors $W_f$ and the labels $\bar{\gamma}$ corresponding to the reference vectors. The processor may construct a target vector based on the average signal-to-noise ratio, the average luminance level, and the luminance dispersion of a current training dataset, and determine, by searching in the vector database, a reference vector having a greatest similarity to the target vector. The processor may determine the label corresponding to the reference vector as the discount factor corresponding to the target vector.

In some embodiments, as shown in FIG. 3, the processor may also determine the discount factor 320 based on the dataset feature 310 via a hyper-parameter determination model 330.

In some embodiments, the hyper-parameter determination model may be a machine learning model. For example, the hyper-parameter determination model may be a deep neural network (DNN), etc.

As shown in FIG. 3, an input of the hyper-parameter determination model 330 may include the average signal-to-noise ratio 310-1, the average luminance level 310-2, and the luminance dispersion 310-3 in the dataset feature 310 of the training dataset, and an output of the hyper-parameter determination model 330 may include the discount factor 320.

In some embodiments, the hyper-parameter determination model may be acquired based on training samples and corresponding training labels. One training sample may be constructed based on the historical average signal-to-noise ratio, the historical average luminance level, and the historical luminance dispersion of one of the above-described representative datasets in historical data, and the training label corresponding to the training sample is the historical discount factor corresponding to the representative dataset.

In some embodiments, the processor may input the training samples into an initial hyper-parameter determination model, construct a loss function based on the discount factor outputted by the initial hyper-parameter determination model, and iteratively update the initial hyper-parameter determination model based on the loss function. When a preset training condition is satisfied, the training of the initial hyper-parameter determination model is completed, and the hyper-parameter determination model is obtained. The preset training condition may be include the loss function converging, a count of iterations reaching a preset count threshold, or the like. Manners of iterative updating include, but are not limited to, gradient descent, etc.

In some embodiments of the present disclosure, the discount factor can be quickly and accurately determined using a learning capability of the machine learning model (i.e., the hyper-parameter determination model) based on the dataset feature of the training dataset.

In some embodiments of the present disclosure, since a convergence difficulty of the training is related to the dataset feature of the training dataset, determining the discount factor based on the dataset feature of the training dataset can make the determined discount factor more reasonable and practical. This approach helps avoid choosing an excessively large discount factor that might hinder training convergence.

In some embodiments, as shown in FIG. 3, the dataset feature 310 may further include a correlation value 310-4, and the input of the hyper-parameter determination model 330 may further include the correlation value 310-4.

Figure 4:
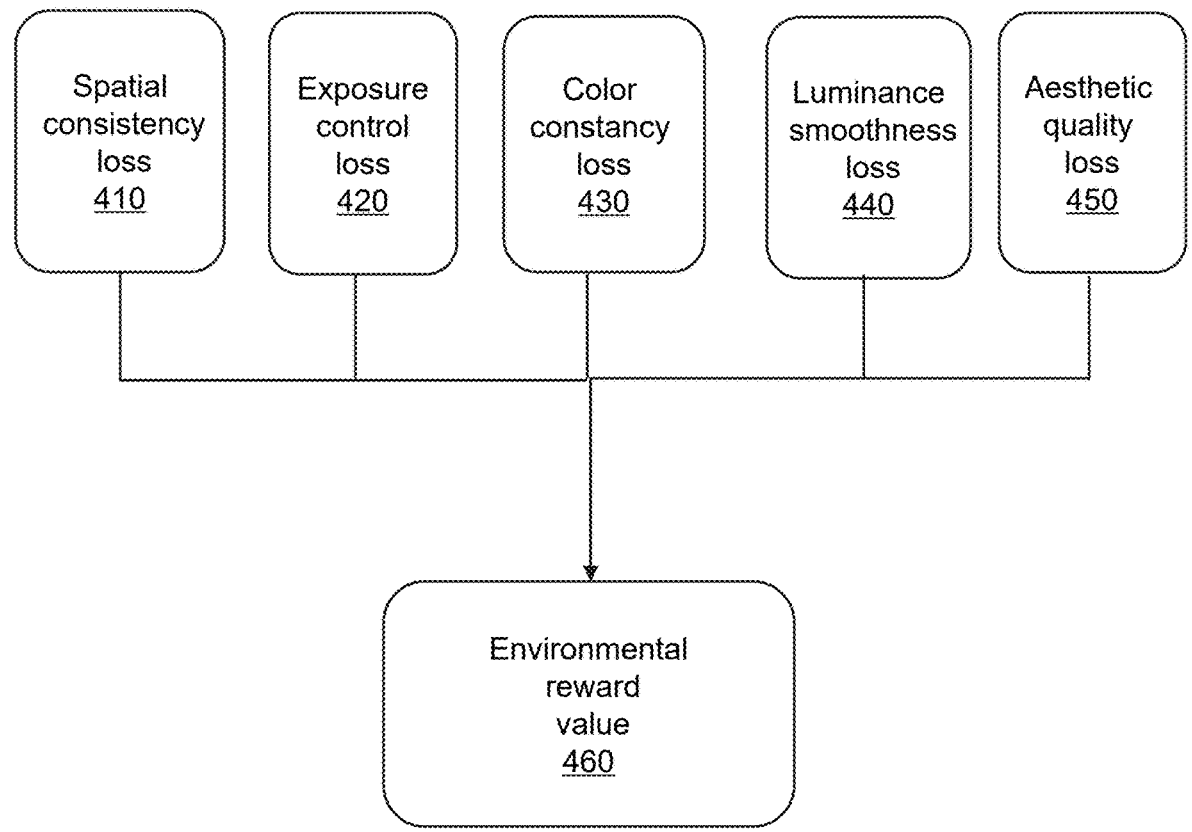
FIG. 4 is an exemplary schematic diagram for determining an environmental reward value according to some embodiments of the present disclosure.

More descriptions of the correlation value may be found in the related description of FIG. 4.

In some embodiments, the training samples for training the hyper-parameter determination model may include a historical correlation value, i.e., one training sample includes the historical average signal-to-noise ratio, the historical average luminance level, the historical luminance dispersion, and the historical correlation value of one representative dataset, and the training label corresponding to the training sample is the historical discount factor corresponding to the representative dataset.

In some embodiments of the present disclosure, including the correlation value of the training dataset into the input of the hyper-parameter determination model can make the determined discount factor more accurate.

In some embodiments, in response to the images of non-normal luminance including a nighttime surveillance image, the input of the hyper-parameter determination model may further include a density of people of the training dataset. The nighttime surveillance image refers to an image captured by a surveillance device at night for identifying and tracking people. The density of people may be obtained based on a count of people in each image of the training dataset.

In some embodiments, the processor may determine, via an image recognition model, the count of people in each image in the training dataset, and determine an average of the counts of people in a plurality of images in the training dataset as the density of people of the training dataset.

In some embodiments, the training sample used to train the hyper-parameter determination model may further include a historical density of people. In other words, one training sample is constructed based on the historical average signal-to-noise ratio, the historical average luminance level, the historical luminance dispersion, the historical correlation value, and the historical density of people of a representative dataset of historical nighttime surveillance images, and the training label corresponding to the training sample is the historical discount factor corresponding to the representative dataset.

In some embodiments of the present disclosure, if the images of non-normal luminance include nighttime surveillance images, including the density of people into the input of the hyper-parameter determination model can make the discount factor determined by the hyper-parameter determination model more accurate.

In some embodiments, the processor may obtain the environmental reward value $R^{(t)}$ through various manners. For example, the processor may record the historical phase image, the action, and the immediate environmental reward value corresponding to each time point from time t to time t+n−1. At the time t+n−1, the processor uses the value network to output the expected total reward $V(s^{(t+n)})$ from time t+n onwards. Based on the immediate reward values from t to time t+n−1 and the expected total reward after time t+n, the environmental reward is determined by balancing with the discount factor using the following equation:

$$R^{(t)} = r^{(t)} + \gamma r^{(t+1)} + \gamma^2 r^{(t+2)} + \ldots + \gamma^{n-1} r^{(t+n-1)} + \gamma^n V(s^{(t+n)}) \quad (2)$$

In S3.2, training the training dataset based on the historical phase images to obtain the value network output value.

In some embodiments, the processor may input the state $s^{(t)}$ corresponding to each of the historical phase images at the time t into the value network for forward propagation, and the value network may output the expected total reward $V(s^{(t)})$.

In S3.3, updating the value network using the following equation based on the environmental reward value and the value network output value:

$$d\theta_v = \nabla_{\theta_v} (R^{(t)} - V(s^{(t)}))^2 \quad (3)$$

Wherein $\theta_v$ represents a parameter of the value network. $(R^{(t)} - V(s^{(t)}))^2$ is a loss function, referred to as a mean squared error (MSE), which is used to measure an error between a predicted value (i.e., the expected total reward) of the value network and an actual reward (i.e., the environmental reward value) obtained at the time step t. $\nabla_{\theta_v}(R^{(t)} - V(s^{(t)}))^2$ represents a gradient of the loss function with respect to the value network parameters $\theta_v$.

In S3.4, updating the policy network based on the environmental reward value and the predicted value using the following equations:

$$A(a^{(t)}, s^{(t)}) = R^{(t)} - V(s^{(t)}) \quad (4)$$

$$d\theta_p = -\nabla_{\theta_p} \log \pi(a^{(t)} | s^{(t)}) A(a^{(t)} | s^{(t)}) \quad (5)$$

Wherein $\theta_p$ represents the parameter of the policy network.

The output of the policy network is the policy $\pi(a^{(t)}|s^{(t)})$ for taking the action $a^{(t)} \in A$, $\pi(a^{(t)}|s^{(t)})$ is a probability calculated by a softmax function. A represents an action space, and an output dimension of the policy network is $|A|$.

In some embodiments, the processor may turn the output of the policy network into a probability distribution via a softmax layer, applicable to the action space A. The action space A refers to a set of all possible actions $a^{(t)}$. The output dimension $|A|$ of the policy network refers to a size of the action space A.

$A(a^{(t)}, s^{(t)}) = R^{(t)} - V(s^{(t)})$ represents an advantage of taking the action $a^{(t)}$ in the state $s^{(t)}$, i.e., an additional benefit resulting from the environmental reward value $R^{(t)}$ compared to the expected reward value $V(s^{(t)})$ when taking the action $a^{(t)}$ in the state $s^{(t)}$. If A >0, it indicates an advantage in taking the action $a^{(t)}$ in the state $s^{(t)}$ and an occurrence probability of the action $a^{(t)}$ may be increased. If A <0, it indicates that taking the action $a^{(t)}$ in the state $s^{(t)}$ is not desirable, and the occurrence probability of the action $a^{(t)}$ may be decreased.

$\log \pi(a^{(t)}|s^{(t)}) A(a^{(t)}|s^{(t)})$ denotes a logarithmic probability of taking the action $a^{(t)}$ in the state $s^{(t)}$. $\nabla_{\theta_p} \log \pi(a^{(t)}|s^{(t)}) A(a^{(t)}|s^{(t)})$ denotes a gradient of the logarithmic probability with respect to the parameter $\theta_p$ of the policy network. If A >0, $\theta_p$ may be increased; if A <0, $\theta_p$ may be decreased.

In some embodiments, a range of the action space A is set to $A \in [-0.5, 0.5]$ with a step size of 0.05 for a predefined output representation as follows:

$$I_t(x) = I_{t-1}(x) + A_t(x) I_{t-1}(x)(1 - I_{t-1}(x)) \quad (6)$$

Wherein $I_{t-1}(x)$ represents a pixel value of an image pixel point x at a $(t-1)^{th}$ iteration, $A_t(x)$ represents an action selected for the image pixel point x at a $t^{th}$ iteration, and $I_t(x)$ represents an enhanced pixel value of the image pixel point x at the $t^{th}$ iteration. $I_t(x)$ denotes an enhanced pixel value of after the action $A_t(x)$ is taken on $I_{t-1}(x)$.

In some embodiments, the range of the action space A may be empirically set by a technician to $A \in [-0.5, 0.5]$ with a step size of 0.05.

In some embodiments, similar to image luminance curve adjustments used in photo-editing software, the predefined output representation is a quadratic curve, expressed by the following equation:

$$I_{output}(x) = I_{input}(x) + \delta I_{input}(x)(1 - I_{input}(x)) \quad (7)$$

Wherein, x denotes a pixel coordinate, δ denotes an adjustment parameter, $I_{input}(x)$ denotes a pixel value at the coordinate x of an input image, which is normalized in a range of [0, 1], and $I_{output}(x)$ represents an output pixel value after an adjustment of the adjustment parameter.

In some embodiments of the present disclosure, the above settings ensure that each pixel is in the normalized range of [0, 1], and reduce costs of identifying a suitable enhancement policy. In addition, for different choices of enhancement iteration counts, the enhancement curve can effectively cover the pixel value space under the action space setting.

In some embodiments, the range of the action space A may be determined based on the value of t. For example, the range of the action space A may be gradually narrowed as the value of t increases.

The value of t refers to the time step t or the count of iterations (the $t^{th}$ iteration). The larger the value of t is, the larger the count of training iterations is, i.e., the later the training time is. t may take any integer value in a range of 1 to 1,000.

In some embodiments, the range of the action space A corresponding to the value of t may be expressed as:

$$A \in \left[-\left(a_0 - \frac{t}{u}\right), \left(a_0 - \frac{t}{u}\right)\right] \quad (8)$$

Wherein, $a_0$ represents a standard action, which may be preset by a human based on experience, for example, $a_0=0.5$. u represents an adjustment coefficient to adjust an order of magnitude such that $$\frac{t}{u}$$

is much smaller than $a_0$. u may be a positive number preset empirically. For example, if $a_0=0.5$ and t takes a value in the range of 1 to 1,000, u may take the value of 10,000, then $$\frac{t}{u}$$

is in a range of 0.0001 to 0.1, which is much smaller than a0, and $$\left(a_0 - \frac{t}{u}\right)$$

is in a range of 0.4 to 0.4999, such that the action space A is not too restricted.

The action space A is critical to a performance of the policy network because a too small range results in limited enhancement of the low-light image, while a too large range results in an overly large search space, and network training may become very difficult. In some embodiments of the present disclosure, as the value of t increases, a probability of approaching a high-quality image increases, and at this point, gradually narrowing the range of the action space A can appropriately reduce the search space, thereby increasing the probability of accelerated convergence.

In some embodiments, the range of the action space A may be further correlated to a count of objects of the trained image at time t.

In some embodiments, the range of the action space A corresponding to the t may be further represented as:

$$A \in \left[-\left(a_0 - \frac{t}{u_1} + \frac{\lambda}{u_2}\right), \left(a_0 - \frac{t}{u_1} + \frac{\lambda}{u_2}\right)\right] \quad (9)$$

Where $u_1$ represents an adjustment coefficient to adjust an order of magnitude such that $$\frac{t}{u}$$

is much smaller than $a_0$, n represents the count of objects in the trained image at the time t, $u_2$ represents an adjustment coefficient, which is used to adjust the order of magnitude, and $u_2$ may be a positive number preset empirically, so that $$\frac{h}{u_2}$$

is much smaller than $a_0$ and similar in the order of magnitude to $$\frac{t}{u_1}$$

The count of objects refers to a count of objects contained in the image, and the objects may include people, animals, still lives, or the like. In some embodiments, the count of objects in the image may be determined by the processor based on an image recognition technique (e.g., a trained image recognition model).

In some embodiments, responsive to the images of non-normal luminance including a nighttime surveillance image, the range of the action space A may further correlate to the density of people in the training image at time t.

More descriptions of the image of non-normal luminance, the nighttime surveillance image, and the density of people may be found in the related descriptions above.

In some embodiments, the range of the action space A corresponding to the time t may be further represented as:

$$A \in \left[-\left(a_0 - \frac{t}{u_1} + \frac{g}{u_3}\right), \left(a_0 - \frac{t}{u_1} + \frac{g}{u_3}\right)\right] \quad (10)$$

Wherein, $u_1$ represents an adjustment coefficient to adjust an order of magnitude such that $$\frac{t}{u}$$

is much smaller than $a_0$, g represents the count of objects in the trained image at time t, $u_3$ denotes an adjustment coefficient used to adjust the order of magnitude and may be a positive number pre-set manually based on experience, so that is much smaller than $a_0$ and comparable in magnitude to $$\frac{t}{u_1}.$$

$$\frac{g}{u_3}$$

In some embodiments of the present disclosure, the larger the count of objects or the count of people (i.e., the density of people) in an image, the more complex the image is, and to achieve better enhancement effects, the corresponding enhancement policy may be more complex. In this case, increasing the range of the action space A can appropriately increase the search space, thereby increasing the probability of finding the enhancement policy corresponding to a high-quality image.

In some embodiments of the present disclosure, by expanding the range of the action space defined in reinforcement learning, the enhancement operations obtained for the input low-light image have a larger dynamic range, providing greater flexibility for real-world scenarios. Considering the situations of uneven lighting and backlighting in low-light scenes, not only is there an action to enhance the luminance level of the image, but the action space also includes actions to darken the image. This way of defining can better meet the needs of low-light image enhancement in real-world scenarios.

In each step of the enhancement operation, the low-light image is first input into the policy network. The policy network formulates an enhancement policy for each pixel of the image based on the current input image and outputs the enhancement policy. The enhancement operation is performed on the input image according to the enhancement policy defined by the policy network. This enhancement operation may be iterated multiple times as per a pre-established plan In S4, completing model training when all samples are trained and all training iterations are completed.

The model refers to a reinforcement learning model, which may be used for enhancing low-light images. An input of the model includes a low-light image and an output of the model includes an enhanced image result.

In S5, outputting an image result after the enhancement of the low-light image.

In some embodiments, the processor may input a low-light image into a trained enhancement model to output the enhanced image result.

In some embodiments of the present disclosure, considering the complexity of low-light image formation and scenes, the action space range is defined more broadly, including not only operations that increase image pixel luminance but also operation that decrease the image pixel luminance. Enhancement operations may be performed multiple times. By learning a random enhancement strategy, it provides higher flexibility for real-world scenes. Furthermore, when calculating the loss function, a new aesthetic quality score, which may be approximately considered a subjective user evaluation metric, is introduced as part of the loss function alongside the more flexible no-reference loss. In this way, the trained policy network and value network can effectively enhance low-light images, making the captured images brighter, with higher contrast and more distinct structural information. This is beneficial for subsequent high-level tasks such as object detection, face recognition, and image classification, which has significant practical implications.

FIG. 2 is a block diagram of an exemplary algorithmic framework of a method for enhancement of a low-light image based on reinforcement learning and aesthetic evaluation according to some embodiments of the present disclosure.

In some embodiments, as shown in FIG. 2, the processor may extract an image feature through a shared network based on a current state image. The processor uses the image feature to train the policy network and the value network. The policy network outputs a policy, while the value network outputs a value network output value. More descriptions of the above process may be found in related descriptions in FIG. 1 and FIG. 3.

FIG. 4 is an exemplary schematic diagram for determining an environmental reward value according to some embodiments of the present disclosure.

In some embodiments, as illustrated in FIG. 4, the environmental reward value 460 in S3.1 takes into account the following influence factors: a spatial consistency loss 410, an exposure control loss 420, a color constancy loss, 430 a luminance smoothness loss 440, and an aesthetic quality loss 450.

(1) The spatial consistency loss 410, denoted as $L_{spa}$, may be expressed by the following equation:

$$L_{spa} = \frac{1}{K}\sum_{i=1}^{K}\sum_{j\in\Omega(i)}(|(Y_i - Y_j)| - |(I_i - I_j)|)^2 \quad (11)$$

Wherein K represents a size of a local region; $\Omega(i)$ represents four neighboring regions centered on a region i; Y represents an average grayscale value of pixels in a local region of an enhanced image; and I represents an average grayscale value of pixels in a local region of an input image.

The spatial consistency loss refers to a loss function used to maintain spatial consistency of image content across different regions when processing or modifying an image.

In some embodiments, the size K of the local region in the spatial consistency loss may be set to 4×4. In other words, the local region is a small grid composed of 4 rows and 4 columns of pixels, containing a total of 16 pixels.

In some embodiments of the present disclosure, setting the size of the local region to 4×4 ensures consistent capture of local structures while balancing appropriately between enhanced efficiency and improved effects.

(2) The exposure control loss 420, denoted as $L_{exp}$, may be expressed by the following equation:

$$L_{exp} = \frac{1}{M}\sum_{K=1}^{M}|Y_K - E| \quad (12)$$

Wherein E represents a grayscale level of an image pixel in a RGB color space; M represents a plurality of non-overlapping local regions; Y represents the average grayscale value of the pixels in the local region of the enhanced image, and the size of the local region is {K: K∈[1, M]}.

The exposure control loss refers to a loss function used to adjust the luminance and tone of an image by appropriately modifying an exposure level of the image to strike a balance between overexposure (i.e., too bright) and underexposure (i.e., too dark), thereby enhancing the visual quality of the image.

In some embodiments, the grayscale level E may be set to 0.6, and M represents non-overlapping local regions of size 16×16. In other words, the non-overlapping local regions are small grids consisting of 16 rows and 16 columns of pixels, totaling 256 pixels.

In some embodiments of the present disclosure, by rationally setting the grayscale level E and the size M of the non-overlapping local regions, the exposure control loss can more efficiently guide the model to improve the overall and local luminance levels of the image while preserving its visual quality and details.

(3) The color constancy loss 430, denotes as $L_{col}$, may be expressed by the following equation:

$$L_{col} = \sum\nolimits_{\forall (p,q) \in \varepsilon} (J^p - J^q)^2, \varepsilon = \{(R, G), (R, B), (G, B)\} \quad (13)$$

Wherein $J^p$ represents an average grayscale value of pixels in a channel p of the enhanced image, $J^q$ represents an average grayscale value of pixels in a channel q of the enhanced image; (p, q) represents any pair of channels selected from (R,G), (R,B), (G,B), and ε represents a set of (R,G), (R,B), (G,B).

The color constancy loss refers to a loss function used to maintain consistent colors under different lighting conditions by forcing the averages of different color channels to tend toward consistency, thereby reducing color distortion caused by changes in lighting conditions.

(4) The luminance smoothness loss 440, denotes as $L_{tv}$, may be expressed by the following equation:

$$L_{tv} = \frac{1}{N} \sum\nolimits_{n=1}^{N} \sum\nolimits_{c \in \xi} (|\nabla_x E_n^c + \nabla_y E_n^c|)^2, \xi = \{R, G, B\} \quad (14)$$

Wherein $E_n^c$ represents a parametric curve mapping in each state; N represents a count of iterations of image enhancement in the reinforcement learning; $\nabla_x$ represents a horizontal gradient operation, $\nabla_y$ represents a vertical gradient operation; ξ denotes a set of R, G, and B channels in the enhanced image.

n∈[1, N]} denotes an $n^{th}$ iteration or an $n^{th}$ pixel. N also denotes a total count of pixels in the image, representing that the above equation for calculating the luminance smoothness loss iterates through each pixel in the entire image. $\nabla_x E_n^c$ and $\nabla_y E_n^c$ represent a horizontal luminance gradient and a vertical luminance gradient of the $n^{th}$ pixel in a color channel c.

The luminance smoothness loss refers to a loss function that measures a degree of smoothness in an image, which may be used to reduce noise in the image while preserving important edge details, thereby ensuring smooth transitions in image luminance.

(5) The aesthetic quality loss 450.

Currently, an aesthetic image analysis has gained increasing attention in the field of computer vision. The aesthetic image analysis is related to the advanced perception of visual aesthetics. Machine learning models for image aesthetic quality assessment have broad applications, such as image retrieval, photo management, image editing, and photography. For humans, aesthetic quality evaluation is always associated with factors such as the color and luminance of the image, image quality, composition and depth, and semantic content. Therefore, it is difficult to view aesthetic quality evaluation as an isolated task.

In some embodiments, to score the aesthetic quality of the enhanced image, two additional image aesthetic scoring deep learning network models, denoted as a $Model_1$ and a $Model_2$, are introduced to calculate the aesthetic quality loss. A color and luminance attribute of the enhanced image and a quality attribute of the enhanced image are used to train the $Model_1$ and the $Model_2$, respectively.

The aesthetic quality loss, denoted as $L_{eva}$, is scored using an additionally introduced aesthetic evaluation model including the following equation:

$$L_{eva} = \alpha f_1 + \beta f_2 \quad (15)$$

Wherein $f_1$ denotes a score of the color and luminance attribute of the enhanced image, which is a score output by the $Model_1$ when the enhanced image is input to the $Model_1$; $f_2$ denotes a score of the quality attribute of the enhanced image, which is a score output by the $Model_2$ when the enhanced image is input to the $Model_2$. The higher the scores are, the better the quality of the enhanced image is. α and β are weight coefficients.

The aesthetic quality loss is a loss function used to evaluate the aesthetic quality. In some embodiments, the processor may use the aesthetic quality loss as an aesthetic score. The higher the aesthetic quality loss is, the higher the aesthetic score is, indicating better image quality.

In some embodiments, the weight coefficients α and β may be preset based on experience by technicians.

In some embodiments, the weight coefficients α and β may be determined based on a correlation value of the training dataset. The correlation value reflects an average degree of correlation between a luminance level and an image quality of an image in the training dataset.

In some embodiments, the weight coefficient α may be positively correlated with the correlation value, while the weight coefficient β may be negatively correlated with the correlation value.

In some embodiments, the processor may determine the image luminance level and the image quality for each image in the training dataset, designate the image luminance level and the image quality as two variables, and determine a covariance between the image luminance level and the image quality of the images in the training dataset. If the covariance is positive, the covariance is determined as the correlation value; if the covariance is zero or negative, the correlation value is set to zero. The image quality may be represented by the image signal-to-noise ratio, and the manners for obtaining the image signal-to-noise ratio and image luminance level may be found in the relevant description of FIG. 3.

In some embodiments of the present disclosure, if the correlation value is relatively large, it indicates a positive correlation between the image luminance level and the image quality in the training dataset. In this case, an appropriate value for the weight coefficient α may be designed for the aesthetic quality loss (i.e., to increase an aesthetic assessment proportion for the image luminance level), thereby simultaneously improving both the image luminance level and the image quality. If the correlation value is relatively small, it indicates a weak correlation between the image luminance level and the image quality in the training dataset, and enhancing luminance level does not necessarily improve the image quality. In this case, an appropriate value for the weight coefficient β may be designed for the aesthetic quality loss, i.e., an aesthetic assessment proportion for the image quality may be increased to prioritize the improvement of the image quality.

A goal of image enhancement is to make the immediate environmental reward value r$^{(t)}$ as large as possible. The smaller the spatial consistency loss, the exposure control loss, the color constancy loss, and the luminance smoothness loss are, the better the quality of the enhanced image is. The larger the aesthetic quality loss is, the better the quality of the enhanced image is. Thus, the immediate environmental reward value r$^{(t)}$ at the time t may be represented by the following equation:

$$r^{(t)} = -L_{spa} - L_{exp} - L_{col} - L_{tv} + L_{eva} \qquad (16)$$

In some embodiments, the reward value r$^{(t)}$ at the time t may be obtained based on a weighted summation of the spatial consistency loss, the exposure control loss, the color constancy loss, the luminance smoothness loss, and the aesthetic quality loss. A weight of the aesthetic quality loss is related to a global image difference of images in the training dataset.

In some embodiments, the immediate environmental reward value at the time t may be calculated by the following equation:

$$r^{(t)} = -\beta_1 * L_{spa} - \beta_2 * L_{exp} - \beta_3 * L_{col} - \beta_4 * L_{tv} + \beta_5 * L_{eva} \qquad (17)$$

Wherein $\beta_1$, $\beta_2$, $\beta_3$, $\beta_4$, and $\beta_5$ are weight coefficients of $L_{spa}$, $L_{exp}$, $L_{col}$, $L_{tv}$, and $L_{eva}$, respectively. $\beta_1$, $\beta_2$, $\beta_3$, $\beta_4$, and $\beta_5$ may be pre-set by technicians based on experience.

In some embodiments, $\beta_5$ may be related to the global image difference of images in the training dataset.

The global image difference refers to an average degree of variation among the images in the training dataset.

In some embodiments, the processor may designate the luminance dispersion as the global image difference. More descriptions of the luminance dispersion may be found in the relevant descriptions of FIG. 3.

In some embodiments, the global image difference may be obtained based on a first global difference and a second global difference. The first global difference may be determined based on the luminance levels of the images in the training dataset, and the second global difference may be determined based on the count of objects in each of the images in the training dataset.

In some embodiments, the processor may determine a variance (or standard deviation) of the luminance levels of the images in the training dataset as the first global difference, determine a variance (or standard deviation) of the counts of objects in the images in the training dataset as the second global difference, and determine an average of the first global difference and the second global difference as the global image difference.

More descriptions of the count of objects may be found in the relevant descriptions of FIG. 1.

In some embodiments, if the global image difference is large, it indicates a wide variety and complexity in the types of images in the training dataset, which makes it difficult to judge the image quality solely by objective mechanical standards. Therefore, increasing the weighting of subjective factors (e.g., the aesthetic quality loss) in the evaluation can help improve the effect of image enhancement after the training of the enhancement model is completed.

In some embodiments of the present disclosure, the first global difference and the second global difference are obtained through the luminance levels of the images in the training dataset and the count of objects in the images, respectively. By combining the first global difference and the second global difference, the determined global image difference can be more accurate.

In some embodiments, the environmental reward value at the time t, taking into account the influence factors, may be calculated using Equation (1):

$$R^{(t)} = r^{(t)} + \gamma r^{(t+1)} + \gamma^2 r^{(t+2)} + \ldots + \gamma^{n-1} r^{(t+n-1)} + \gamma^n V(s^{(t+n)}) \qquad (1)$$

More descriptions of Equation (1) may be found in the relevant description of FIG. 1.

In some embodiments of the present disclosure, by introducing no-reference loss functions as objective evaluation metrics, such as the spatial consistency loss, the exposure control loss, the color constancy loss, and the luminance smoothness loss, and simultaneously incorporating scores from aesthetic quality assessments as part of the loss function to simulate indicators of user subjective evaluation, the enhanced image can achieve better visual effects and higher user subjective evaluation scores. This can better guide the low-light image enhancement model to generate high-quality images that satisfy users.

In some embodiments, the processor may acquire a low-light image from a monitoring device. In response to determining that at least one of the image quality or the luminance level of the enhanced low-light image does not meet a preset image condition, the processor generates and sends a parameter adjustment instruction to the monitoring device. After the monitoring device adjusts an exposure parameter, the processor reacquires a nighttime surveillance image from the monitoring device and transmits the night-time image to an interactive input unit as a reacquired low-light image. The reacquired low-light image is then input into the enhancement model to obtain the enhanced image result from the model.

In some embodiments, the monitoring device may be configured to capture nighttime surveillance images for personnel identification and tracking through an infrared camera, a low-light camera, or the like.

The preset image condition may include at least one of the image quality being below a preset quality threshold or the luminance level being below a preset luminance threshold. The preset quality threshold and the preset luminance threshold may be predefined by technicians based on experience. If at least one of the image quality or the luminance level of the enhanced low-light image result does not meet the preset image condition, it indicates that the lighting condition for the low-light image is too poor (e.g., too low illumination), which makes it difficult for the model to achieve a satisfactory enhancement effect.

In some embodiments, the parameter adjustment instruction may include the adjustment amount for the exposure parameter of the monitoring device. The exposure parameter may include one or more of an aperture size, a shutter speed, a gain, and an ISO.

In some embodiments, if at least one of the image quality or the luminance level of the enhanced low-light image result does not meet preset image condition, the processor may determine the adjustment amount of the exposure parameter by querying a preset table based on at least one of the image quality or the luminance level of the enhanced low-light image result and a current exposure parameter of the monitoring device, thereby generating and sending the parameter adjustment instruction to the monitoring device.

The preset table may include a correlation between at least one of the image quality or the luminance level of the enhanced low-light image result, the exposure parameter of the monitoring device, and the corresponding adjustment amount of the exposure parameter. The preset table may be constructed in advance by technicians based on historical data and experience.

In some embodiments, the preset table may also include a count of people in the enhanced low-light image result. The processor may determine the adjustment amount for the exposure parameter by querying the preset table based on at least one of the image quality or the luminance level of the enhanced low-light image result, the count of people, and the current exposure parameter of the monitoring device.

In some embodiments, after the monitoring device adjusts the exposure parameter (e.g., enlarging the aperture size, increasing the ISO, slowing the shutter speed, etc.), the processor may reacquire the nighttime surveillance image from the monitoring device and transmit the nighttime surveillance image to the interactive input unit as the reacquired low-light image.

The interactive input unit refers to a hardware or software interface for interacting with a system. For example, the interactive input unit may include a touchscreen, a virtual keyboard, etc. Data can be inputted to the system through the interactive input unit.

In some embodiments, the processor may input the reacquired low-light image into an enhancement model to obtain the enhanced low-light image results output by the enhancement model. The enhancement model may include the policy network and the value network, which may be trained through the operations S1 to S4 described above.

Additionally, some features, structures, or characteristics in one or more embodiments of the present disclosure may be appropriately combined.

In some embodiments, counts describing the quantity of components and attributes are used. It should be understood that such counts used in the description of the embodiments use the modifiers "about," "approximately," or "substantially" in some examples. Unless otherwise stated, "about", "approximately" or "substantially" indicates that the stated figure allows for a variation of ±20%. Accordingly, in some embodiments, the numerical parameters used in the disclosure and claims are approximations that may vary depending upon the desired characteristics of individual embodiments. In some embodiments, numerical parameters should consider the specified significant digits and adopt the general digit retention method. Although the numerical ranges and parameters used in some embodiments of the present disclosure to confirm the breadth of the range are approximations, in specific embodiments, such numerical values are set as precisely as practicable.

Further, should there be any inconsistency or conflict between the description, definition, and/or the use of terms associated with any of the incorporated material and that associated with the present disclosure, the description, definition, and/or the use of the terms in the present disclosure shall prevail.

What is claimed is:

1. A method for enhancement of a low-light image based on reinforcement learning and aesthetic evaluation, comprising:

S1, generating images of non-normal luminance under different lighting scenes, and constructing a training dataset for a reinforcement learning system based on the images of non-normal luminance;

S2, initializing the training dataset, a policy network, and a value network in the reinforcement learning system;

S3, updating, based on a no-reference reward score and an aesthetic assessment reward score, the policy network and the value network;

S4, completing model training when all samples are trained and all training iterations are completed;

S5, outputting an image result after the enhancement of the low-light image;

wherein the initializing a policy network and a value network in the operation S2 includes:

inputting a current state $s^{(t)}$ into the policy network and the value network, wherein $s^{(t)}$ denotes a state at a time t; an output of the policy network is a policy $\pi(a^{(t)}|s^{(t)})$ for taking an action $a^{(t)}$; and an output of the value network is a value network output value $V(s^{(t)})$, representing an expected total reward from the current state $s^{(t)}$;

the updating the policy network and the value network in S3 includes:

S3.1, training the training dataset based on historical phase images to obtain an environmental reward value, denoted as $R^{(t)}$, using the following equation:

$$R^{(t)} = r^{(t)} + \gamma r^{(t+1)} + \gamma^2 r^{(t+2)} + \ldots + \gamma^{n-1} r^{(t+n-1)} + \gamma^n V(s^{(t+n)})$$

wherein, $\gamma^i$ denotes an $i^{th}$ power of a discount factor $\gamma$ and $r^{(t)}$ represents an immediate environmental reward value at the time t; wherein the following influence factors are taken into account for obtaining the environmental reward value:

a spatial consistency loss, denoted as $L_{spa}$:

$$L_{spa} = \frac{1}{K}\sum_{i=1}^{K}\sum_{j\in\Omega(i)}(|(Y_i - Y_j)| - |(I_i - I_j)|)^2$$

wherein K represents a size of a local region; $\Omega(i)$ represents four neighboring regions centered on a region i; Y represents an average grayscale value of pixels in a local region of an enhanced image; and I represents an average grayscale value of pixels in a local region of an input image;

an exposure control loss, denoted as $L_{exp}$:

$$L_{exp} = \frac{1}{M}\sum_{K=1}^{M}|Y_K - E|$$

wherein E represents a grayscale level of an image pixel in a RGB color space; M represents a plurality of non-overlapping local regions; Y represents the average grayscale value of the pixels in the local region of the enhanced image, and the size of the local region is $\{K: K\in[1, M]\}$;

a color constancy loss, denotes as $L_{col}$:

$$L_{col} = \sum_{\forall (p,q) \in \varepsilon} (J^p - J^q)^2, \varepsilon = \{(R, G), (R, B), (G, B)\}$$

wherein $J^p$ represents an average grayscale value of pixels in a channel p of the enhanced image, $J_q$ represents an average grayscale value of pixels in a channel q of the enhanced image; (p, q) represents any pair of channels selected from (R,G), (R,B), (G,B), and $\varepsilon$ represents a set of (R,G), (R,B), (G,B);

a luminance smoothness loss, denotes as $L_{tv}$:

$$L_{tv} = \frac{1}{N} \sum_{n=1}^{N} \sum_{c \in \xi} (|\nabla_x E_n^c + \nabla_y E_n^c|)^2, \xi = \{R, G, B\}$$

wherein $E_n^c$ represents a parametric curve mapping in each state; N represents a count of iterations for image enhancement in the reinforcement learning; $\nabla_x$ represents a horizontal gradient operation, $\nabla_y$ represents a vertical gradient operation; $\xi$ denotes a set of R, G, and B channels in the enhanced image; and an aesthetic quality loss, denoted as $L_{eva}$;

in order to score the aesthetic quality of the enhanced image, two additional image aesthetic scoring deep learning network models, denoted as a $Model_1$ and a $Model_2$, are introduced to calculate the aesthetic quality loss; a color and luminance attribute of the enhanced image and a quality attribute of the enhanced image are used to train the $Model_1$ and the $Model_2$, respectively; and the aesthetic quality loss is scored using an additionally introduced aesthetic evaluation model including the following equation:

$$L_{eva} = \alpha f_1 + \beta f_2$$

wherein $f_1$ denotes a score of the color and luminance attribute of the enhanced image, which is a score output by the $Model_1$ when the enhanced image is input to the Model; $f_2$ denotes a score of the quality attribute of the enhanced image, which is a score output by the $Model_2$ when the enhanced image is input to the $Model_2$, and the higher the score is, the better the quality of the enhanced image is; $\alpha$ and $\beta$ are weight coefficients;

a goal of image enhancement is to make the immediate environmental reward value $r^{(t)}$ as large as possible; the smaller the spatial consistency loss, the exposure control loss, the color constancy loss, and the luminance smoothness loss are, the better the quality of the enhanced image is; the larger the aesthetic quality loss is, the better the quality of the enhanced image is; thus, the immediate environmental reward value $r^{(t)}$ at the time t is represented as follows:

$$r^{(t)} = -L_{spa} - L_{exp} - L_{col} - L_{tv} + L_{eva}$$

the environmental reward value at the time t, taking into account the influence factors, is expressed as follows:

$$R^{(t)} = r^{(t)} + \gamma r^{(t+1)} + \gamma^2 r^{(t+2)} + \ldots + \gamma^{n-1} r^{(t+n-1)} + \gamma^n V(s^{(t+n)});$$

S3.2, training the training dataset based on the historical phase images to obtain the value network output value;

S3.3, updating the value network using the following equation based on the environmental reward value and the value network output value:

$$d\theta_v = \nabla_{\theta_v} (R^{(t)} - V(s^{(t)}))^2$$

wherein $\theta_v$ represents a value network parameter;

S3.4, updating the policy network based on the environmental reward value and a predicted value using the following equations:

$$A(a^{(t)}, s^{(t)}) = R^{(t)} - V(s^{(t)})$$
$$d\theta_p = -\nabla_{\theta_p} \log \pi(a^{(t)}|s^{(t)}) A(a^{(t)}|s^{(t)})$$

wherein $\theta_p$ represents a parameter of the policy network, the output of the policy network is the policy $\pi(a^{(t)}|s^{(t)})$ for taking the action $a^{(t)} \in A$, $\pi(a^{(t)}|s^{(t)})$ is a probability calculated by a softmax function; A represents an action space; an output dimension of the policy network is |A|.

2. The method of claim 1, wherein a range of the action space A is set as $A \in [-0.5, 0.5]$ with a step size of 0.05 for a predefined output representation as follows:

$$I_t(x) = I_{t-1}(x) + A_t(x) I_{t-1}(x)(1 - I_{t-1}(x))$$

wherein $I_{t-1}(x)$ represents a pixel value of an image pixel point x at a $(t-1)^{th}$ iteration, $A_t(x)$ represents an action selected for the image pixel point x at a $t^{th}$ iteration, and $I_t(x)$ represents an enhanced pixel value of the image pixel point x at the $t^{th}$ iteration.

3. The method of claim 1, wherein, in the spatial consistency loss, the size of the local region K is set to 4×4 pixels.

4. The method of claim 1, wherein, in the exposure control loss, the grayscale level E is set to 0.6, and a size of each of the plurality of non-overlapping local regions, represented by M, is 16×16 pixels.

* * * * *